US012451914B2

United States Patent
Bien et al.

(10) Patent No.: US 12,451,914 B2
(45) Date of Patent: Oct. 21, 2025

(54) LOW-CURRENT HIGH-LINEARITY LINEAR TRANSMITTER DRIVER

(71) Applicant: NXP USA, Inc., Austin, TX (US)

(72) Inventors: David Edward Bien, Glendale, AZ (US); Siamak Delshadpour, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 406 days.

(21) Appl. No.: 17/990,605

(22) Filed: Nov. 18, 2022

(65) Prior Publication Data

US 2024/0171203 A1 May 23, 2024

(51) Int. Cl.
  *H04B 1/04* (2006.01)
(52) U.S. Cl.
  CPC ......... *H04B 1/0483* (2013.01); *H04B 1/0458* (2013.01); *H04B 2001/0416* (2013.01)
(58) Field of Classification Search
  CPC ...... H04B 1/0483; H04B 1/0458; H04B 1/02; H04B 1/04; H04B 1/40
  See application file for complete search history.

(56) References Cited

U.S. PATENT DOCUMENTS

| 8,872,549 | B2 * | 10/2014 | Herrera | G05F 1/46 327/58 |
| 10,523,204 | B2 * | 12/2019 | Koo | G11C 7/10 |
| 10,812,067 | B1 * | 10/2020 | Delshadpour | H04L 25/0298 |
| 10,942,377 | B2 * | 3/2021 | Nagaraju | H04B 10/5561 |
| 11,165,610 | B1 | 11/2021 | Delshadpour | |
| 2005/0264358 | A1 * | 12/2005 | Damitio | H03F 1/02 330/267 |

OTHER PUBLICATIONS

Hsu, Hao Wen et al. "25 Gb/s NRZ and 50 Gb/s PAM-4 Transimpedance Amplifier with Active Feedback and Equalization in 90 nm CMOS Technology", OPTICS 2019—10th International Conference on Optical Communication Systems, (2019), pp. 251-257.

Kim, Minkyu et al. "A Low-Power 28-Gb/s PAM-4MZM Driver With Level Pre-Distortion", IEEE Transactions on Circuits and Systems—II: Express Briefs, vol. 68, No. 3, Mar. 2021, pp. 908-912.

Fan, Chao et al. "40-Gb/s PAM-4 Transmitter Using a 0.16-pJ/bit SST-CML-Hybrid (SCH) Output Driver and a Hybrid-Path 3-Tap FFE Scheme in 28-nm CMOS", IEEE Transactions on Circuits and Systems—I: Regular Papers, vol. 66, No. 12, Dec. 2019, pp. 4850-4861.

(Continued)

*Primary Examiner* — Tuan Pham (57) ABSTRACT

Embodiments of linear transmitter (TX) drivers are disclosed. In an embodiment, a linear TX driver includes a first transistor connectable between an input voltage and a supply voltage, a second transistor connectable between an inverted version of the input voltage and a reference voltage, a first resistor connected between the first transistor and the second transistor, where an output voltage is outputted from a node between the first resistor and the second transistor, and a second resistor connectable between the second transistor and the reference voltage.

12 Claims, 8 Drawing Sheets

(56) References Cited

OTHER PUBLICATIONS

Joy, Andrew K. et al. "Analog-DFE-Based 16Gb/s SerDes in 40nm CMOS That Operates Across 34dB Loss Channels at Nyquist with a Baud Rate CDR and 1.2Vpp Voltage-Mode Driver", 2011 IEEE International Solid-State Circuits Conference, pp. 350-351.

Rito, P. et al. "A DC-90 GHz 4-Vpp differential linear driver in a 0.13 μm SiGe:C BiCMOS technology for optical modulators" 2017 IEEE MTT-S International Microwave Symposium (IMS), 2017, pp. 439-442.

Fu, J. et al., "A 224-Gb/s PAM4 High-Linearity, Energy-Efficiency Differential to Single-Ended Driver in 130-nm SiGe BiCMOS" 2020 IEEE International Conference on Integrated Circuits, Technologies and Applications (ICTA), 2020, pp. 88-89.

Ren, F. et al. "A 50 Gb/s Linear Driver in 0.13 μm SiGe BICMOS Technology for Mach-Zehnder Modulators" 2020 IEEE 2nd International Conference on Circuits and Systems (ICCS), 2020, pp. 20-23.

Margulis, Walter et al. "Hybrid electronically addressable random fiber laser", Optics Express 23388, Research Article vol. 28, No. 16 / Aug. 3, 2020, 9 pgs.

Chen, Y. et al. "56Gbaud Linear PAM4 Transimepedance Amplifier and VCSEL Driver in 55nm BiCMOS Technology" 2019 IEEE International Symposium on Radio-Frequency Integration Technology (RFIT), 2019, pp. 1-3.

Breyne, Laurens et al. "50 GBd PAM4 transmitter with a 55nm SiGe BiCMOS driver and silicon photonic segmented", Optics Express 23950, Research Article vol. 28, No. 16 / Aug. 3, 2020, 11 pgs.

Liu, Tong et al. "A 40Gb/s Linear Redriver with Multi-Band Equalization in 130nm SiGe BiCMOS", 2021 IEEE BiCMOS and Compound Semiconductor Integrated Circuits and Technology Symposium (BCICTS), (2021), 4 pgs.

Delshadpour, Siamak et al. "Low Power 20.625 Gbps Type-C USB3.2/DP1.4/Thunderbolt3 Combo Linear Redriver in 0.25 μm BiCMOS Technology", IEEE, (2018), pp. 326-329.

* cited by examiner

LOW-CURRENT HIGH-LINEARITY LINEAR TRANSMITTER DRIVER

BACKGROUND

Communication systems, for example, wide band communication systems such as universal serial bus (USB), high-definition multimedia interface (HDMI), DisplayPort (DP), Peripheral Component Interconnect Express (PCIe), Thunderbolt, Converged Input Output (CIO, also known as USB4) often include stages of processing within their electronic circuitry. A communication system can include several stages including modules to equalize, amplify and/or re-drive signals for its data channels. For example, after equalizing a signal using a Continuous Time Linear Equalizer (CTLE), a transmitter (TX) driver can transfer the equalized signal to a load, which can be, for example, 40Ω, 45Ω, or 50Ω depending on a supported standard or application in a next stage (e.g., a retimer or a processor). Because power efficiency is almost always an important concern, it is generally desirable to drive the required signal levels using minimum power while still maintaining necessary signal integrity. Therefore, there is a need for low-current high-linearity linear transmitter drivers with low power consumption and high efficiency.

SUMMARY

Embodiments of linear transmitter (TX) drivers are disclosed. In an embodiment, a linear TX driver includes a first transistor connectable between an input voltage and a supply voltage, a second transistor connectable between an inverted version of the input voltage and a reference voltage, a first resistor connected between the first transistor and the second transistor, where an output voltage is outputted from a node between the first resistor and the second transistor, and a second resistor connectable between the second transistor and the reference voltage. Other embodiments are also described.

In an embodiment, at least one of the first and second transistors includes a bipolar junction transistor (BJT) or a metal-oxide-semiconductor field-effect transistor (MOSFET).

In an embodiment, the first transistor includes a first bipolar junction transistor (BJT), and the second transistor includes a second BJT.

In an embodiment, a collector terminal of the first BJT is connectable to the supply voltage.

In an embodiment, a base terminal of the first BJT is connectable to the input voltage.

In an embodiment, an emitter terminal of the first BJT is connected to the first resistor.

In an embodiment, a collector terminal of the second BJT is connected to the first resistor.

In an embodiment, a base terminal of the second BJT is connectable to the inverted version of the input voltage.

In an embodiment, an emitter terminal of the second BJT is connectable to the second resistor.

In an embodiment, the linear TX driver further includes an inverting circuit configured to generate the inverted version of the input voltage.

In an embodiment, the inverting circuit includes a capacitor and a third resistor.

In an embodiment, the third resistor is connectable to the reference voltage or a bias voltage.

In an embodiment, the reference voltage is zero volt.

In an embodiment, the supply voltage includes a direct current (DC) voltage.

In an embodiment, the linear TX driver is included in a linear redriver.

In an embodiment, a linear transmitter (TX) driver for a linear redriver includes a first bipolar junction transistor (BJT) connectable between a first input voltage and a supply voltage of the linear redriver, a second BJT connectable between the first BJT and a reference voltage, a first resistor connected between the first BJT and the second BJT, wherein a first output voltage is outputted from a first node between the first resistor and the second BJT, a second resistor connectable between the second BJT and the reference voltage, a third BJT connectable between a second input voltage and the supply voltage of the linear redriver, a fourth BJT connectable between the third BJT and the reference voltage, a third resistor connected between the third BJT and the fourth BJT, wherein a second output voltage is outputted from a second node between the third resistor and the fourth BJT, a fourth resistor connectable between the fourth BJT and the reference voltage, and an inverting circuit configured to generate an inverted version of the first and second input voltages.

In an embodiment, the inverting circuit includes capacitors and a plurality of resistors.

In an embodiment, the resistors of the inverting circuit are connectable to a bias voltage.

In an embodiment, the reference voltage is zero volt.

In an embodiment, a direct current (DC)-coupled linear transmitter (TX) driver for a linear redriver includes a first bipolar junction transistor (BJT) connectable between a first input voltage and a supply voltage of the linear redriver, a second BJT connectable between the first BJT and a reference voltage, a first resistor connected between the first BJT and the second BJT, where a first output voltage is outputted from a first node between the first resistor and the second BJT, a second resistor connectable between the second BJT and the reference voltage, a third BJT connectable between a second input voltage and the supply voltage of the linear redriver, a fourth BJT connectable between the third BJT and the reference voltage, a third resistor connected between the third BJT and the fourth BJT, where a second output voltage is outputted from a second node between the third resistor and the fourth BJT, a fourth resistor connectable between the fourth BJT and the reference voltage, and an inverting circuit configured to generate an inverted version of the first and second input voltages. The inverting circuit includes a first capacitor and a fifth resistor connected in parallel between the first BJT and the fourth BJT, a second capacitor and a sixth resistor connected in parallel between the third BJT and the third BJT, a seventh resistor connectable to the second BJT and the reference voltage, and an eighth resistor connectable to the fourth BJT and the reference voltage.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
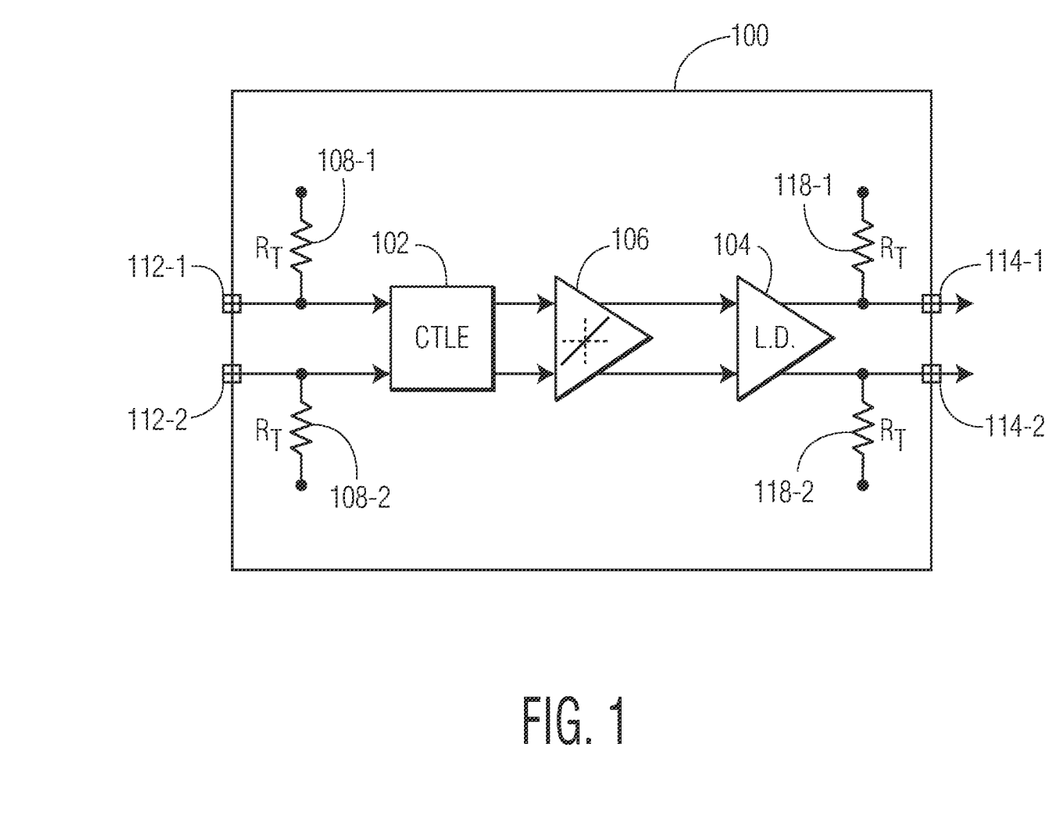
FIG. 1 illustrates an architecture of a linear redriver in which a linear transmitter (TX) driver in accordance with an embodiment of the invention can be used.

FIG. 1 illustrates an architecture of a linear redriver 100 in which a linear transmitter (TX) driver 104 (also referred to as a linear transmitter (TX) line driver (L.D.) 104) in accordance with an embodiment of the invention can be used. The linear redriver can be used to provide signal amplification and/or waveform shaping such that a transmitted signal behaves as intended over long channels. For example, the linear redriver can be used to compensate channel loss and/or to address other signal integrity challenges. The linear redriver may be incorporated in a wired communication device or a wireless communication device. In the embodiment depicted in FIG. 1, the linear redriver generates a desired output signal from output terminals/pins 114-1, 114-2 in response to an input signal received at input terminals/pins 112-1, 112-2. The linear redriver can be used in various applications, such as automotive applications, communications applications, industrial applications, medical applications, computer applications, and/or consumer or appliance applications. For example, the redriver can be used in Universal Serial Bus (USB), Thunderbolt (TBT), DisplayPort (DP), and/or CIO applications. In some embodiments, the linear redriver or at least a component of the linear redriver is implemented in a substrate and is packaged as a stand-alone semiconductor Integrated Circuit (IC) device or chip. In the embodiment depicted in FIG. 1, the linear redriver 100 includes a continuous-time linear equalizer (CTLE) 102 to equalize input signals and the linear TX driver 104 to transmit or retransmit the signals based on signal standard specifications. Due to gain variation over process, voltage and temperature (PVT) and significant parasitic loadings from a corresponding transmitter (not shown in FIG. 1), a gain stage 106 may be needed between the CTLE 102 and the linear TX driver 104. The gain stage 106 can be a programmable gain amplifier (PGA) or an automatic gain control (AGC) stage. Depending on the design, the programmable gain stage can stay or be eliminated. Output from the linear TX driver 104 typically drives load termination resistors 118-1, 118-2 at its outputs, which may be connectable to respective switches. The load termination resistors 118-1, 118-2 with a resistance value $R_T$ (e.g., 50Ω) may be part of a Transmit Termination (TXT). Similar load termination resistors 108-1, 108-2 with a resistance value $R_T$ (e.g., 50Ω) can also be found to affect the inputs of the linear redriver 100, which may be connectable to respective switches. The termination resistors 108-1, 108-2 may be part of a Receive Termination (RXT). The shown input and output termination can be terminated to a supply voltage of the linear redriver 100, but depending on the design, they can be terminated to ground or any direct current (DC) voltage. In some embodiments, the input terminals/pins 112-1, 112-2 and the output terminals/pins 114-1, 114-2 of the linear redriver 100 may be connectable to decoupling capacitors or other electrical elements/loads.

Figure 2:
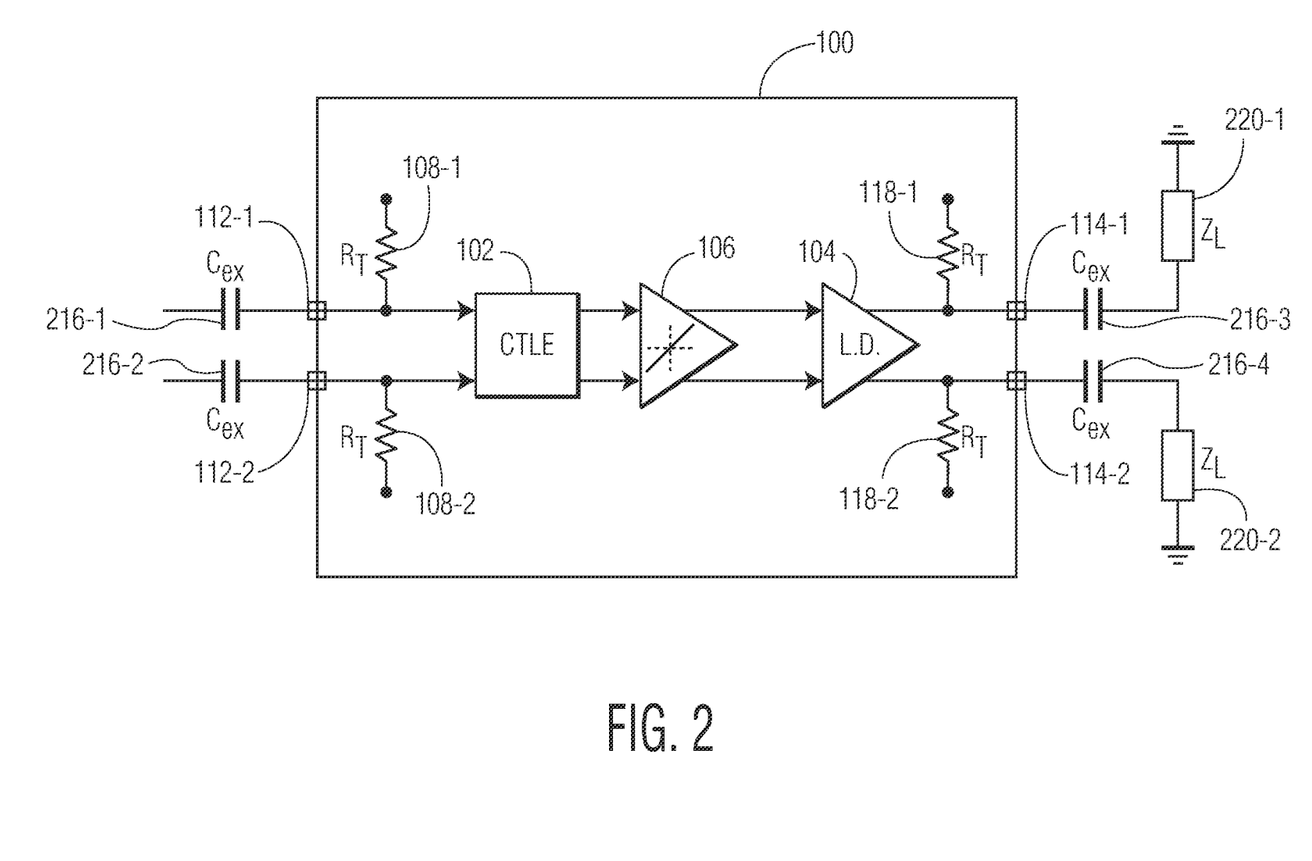
FIG. 2 depicts the linear redriver illustrated in FIG. 1 with decoupling capacitors.

FIG. 2 depicts the linear redriver 100 illustrated in FIG. 1 with decoupling capacitors 216-1, 216-2, 216-3, 216-4. Specifically, an input/output terminal 112-1, 112-2, 114-1, or 114-2 of the linear redriver 100 is electrically connected to a corresponding decoupling capacitor 216-1, 216-2, 216-3, or 216-4 with a large capacitance value $C_{ex}$, which can isolate the DC level of the redriver input/output from an IC chip electrically connected to the redriver that is situated before or after the redriver in the signal path. For example, the capacitance value $C_{ex}$ of the decoupling capacitors 216-1, 216-2, 216-3, 216-4 may be in the range of 100 nF or more. Far-end termination units 220-1, 220-2 with impedance $Z_L$ (e.g., 50Ω output impedance) are connected to the decoupling capacitors 216-3, 216-4 and a supply voltage or a reference voltage (e.g., the ground).

In the embodiment depicted in FIG. 2, the TX driver 104 operates to drive termination loads 220-1, 220-2 disposed at the TX driver output. The TX driver 104 may be an electronic amplifier circuit designed for driving a load such as a transmission line and the output impedance of the electronic amplifier circuit may be matched to the characteristic impedance of the transmission line. For signal integrity considerations (e.g., to minimize reflections), 50Ω output impedance or other output impedance may be required, depending on the communications standard of the linear redriver 100. The TX driver 104 may be implemented as a voltage mode TX driver or a current mode TX driver. For example, a current mode TX driver may use Norton-equivalent parallel termination to control output impedance, while a voltage mode TX driver may use Thevenin-equivalent series termination and potentially ½ to ¼ the current for a given output voltage swing. An ideal voltage mode TX driver with differential termination can enable a potential four times (4×) reduction in driver power. Actual driver power levels may depend on output impedance control, pre-driver power, and equalization implementation. For example, Pulse Amplitude Modulation 2-level (PAM2) devices need good linearity such that wider variation can be tolerated, however PAM 4-level (PAM4) devices need high linearity requirement.

Figure 3:
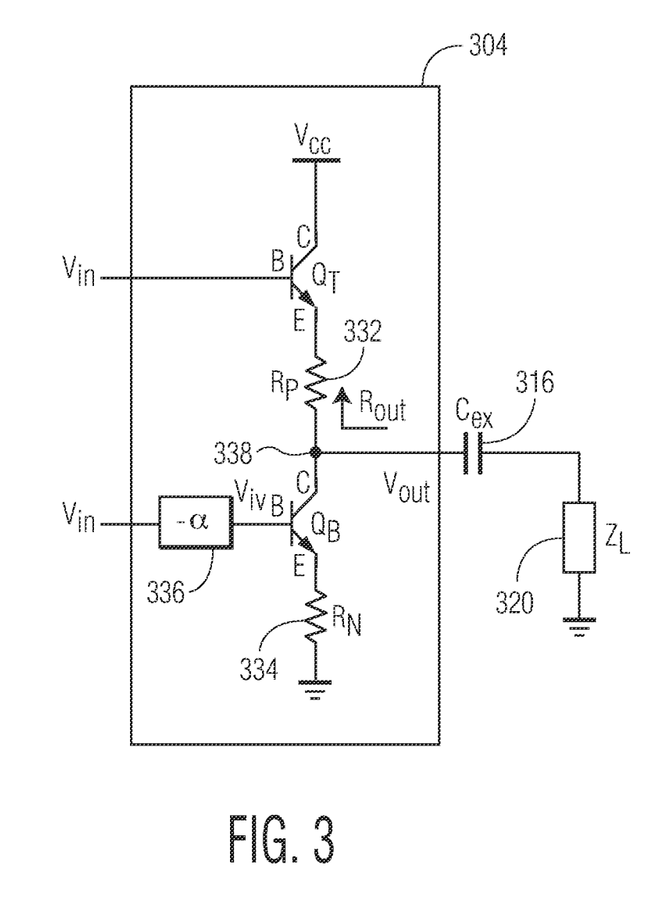
FIG. 3 is a schematic diagram of a voltage mode TX driver in accordance with an embodiment of the invention.

FIG. 3 is a schematic diagram of a voltage mode TX driver 304 in accordance with an embodiment of the invention. The voltage mode TX driver 304 depicted in FIG. 3 is an embodiment of the TX driver 104 depicted in FIGS. 1 and 2. However, the TX driver 104 depicted in FIGS. 1 and 2 is not limited to the embodiment shown in FIG. 3. In the embodiment depicted in FIG. 3, the voltage mode TX driver 304 is a push-pull TX driver in single-ended form that is connectable to a decoupling capacitor 316 with a capacitance value $C_{ex}$ and a termination unit 320 with an impedance value $Z_L$ (e.g., 50Ω output impedance). As shown in FIG. 3, the voltage mode TX driver 304 includes a bipolar junction transistor (BJT) $Q_T$ connectable between an input voltage $V_{IN}$ and a supply voltage $V_{CC}$, a bipolar junction transistor $Q_B$ connectable between an inverted version of the input voltage $V_{IN}$ and a reference voltage (e.g., the ground), a resistor 332 with a resistance value $R_P$ and connectable between the bipolar junction transistor $Q_T$ and the bipolar junction transistor $Q_B$, a resistor 334 with a resistance value $R_N$ and connectable between the bipolar transistor $Q_B$ and the reference voltage (e.g., the ground (zero volt), and an inverting circuit 336. An inverted version of the input voltage $V_{IN}$ may be constructed from the input voltage $V_{IN}$ (e.g., by an inverter and/or an amplifier/attenuator such that the phase of the inverted version of the input voltage $V_{IN}$ is 180 degree from the phase of the input voltage $V_{IN}$) or may be a naturally occurring negative differential signal that is complementary to the input voltage $V_{IN}$ (e.g., the phase of the inverted version of the input voltage $V_{IN}$ is 180 degree from the phase of the input voltage $V_{IN}$). In some embodiments, the input voltage $V_{IN}$ and the inverted version of the input voltage $V_{IN}$ form a differential pair of signals. Although the voltage mode TX driver 304 is depicted in FIG. 3 as implemented using BJTs, in other embodiments, the voltage mode TX driver 304 is implemented using metal-oxide-semiconductor field-effect transistor (MOSFETs). In addition, although the BJTs $Q_T$, $Q_B$ are implemented as NPN transistors in the embodiment depicted in FIG. 3, in other embodiments, at least one of the BJTs $Q_T$, $Q_B$ is implemented as a PNP transistor. An input voltage $V_{IN}$ is applied to the inverting circuit 336 and an output voltage $V_{OUT}$ is outputted to the capacitor 316 from a node 338 that is between the resistor 332 and the bipolar junction transistor $Q_B$. Because the major power consumption of a linear redriver is typically in transmitter (TX) section, a current saving is considered a good performance improvement to drive a standard 50Ω termination or 40Ω or 45Ω depending on the standard and system requirements. In the embodiment depicted in FIG. 3, the voltage mode TX driver 304 is a low-complexity low-current TX driver with high linearity and good return loss over PVT. The simple and low complexity architecture offers a low-risk implementation in an industrial grade IC chip. Using a push-pull based stage with the right biasing and integrated output (500) termination, the termination staying within required range and lowers the current consumption compared to a standard CML TX driver, and the voltage mode TX driver 304 can be incorporated in a high-linearity linear redriver.

In the voltage mode TX driver 304 depicted in FIG. 3, the input voltage $V_{IN}$ is applied to the base terminal (B) of the bipolar junction transistor $Q_T$ through a conductive path (e.g., an electrical wire or line that creates an electrical connection when powered up) such that the bipolar junction transistor $Q_T$ is electrically connected to the input voltage $V_{IN}$, a supply voltage $V_{CC}$ is applied to the collector terminal (C) of the bipolar junction transistor $Q_T$ through a conductive path (e.g., an electrical wire or line that creates an electrical connection when powered up) such that the bipolar junction transistor $Q_T$ is electrically connected to the supply voltage $V_{CC}$, and the emitter terminal (E) of the bipolar junction transistor $Q_T$ is connected to the resistor 332 through a conductive path (e.g., an electrical wire or line that creates an electrical connection when powered up) such that the bipolar junction transistor $Q_T$ is electrically connected to the resistor 332. An inverted version of $V_{IN}$ (e.g., an output signal from the inverting circuit 336) is applied to the base terminal (B) of the bipolar junction transistor $Q_B$ through a conductive path (e.g., an electrical wire or line that creates an electrical connection when powered up) such that the bipolar junction transistor $Q_B$ is electrically connected to the inverting circuit 336, the collector terminal (C) of the bipolar junction transistor $Q_B$ is connected to the resistor 332 through a conductive path (e.g., an electrical wire or line that creates an electrical connection when powered up) such that the bipolar junction transistor $Q_B$ is electrically connected to the resistor 332, and the emitter terminal (E) of the bipolar junction transistor $Q_B$ is connected to the resistor 334, which is connected to ground, through a conductive path (e.g., an electrical wire or line that creates an electrical connection when powered up) such that the bipolar junction transistor $Q_B$ is electrically connected to the resistor 334. In some embodiments, the ratio between an inverted version of the input voltage $V_{IN}$ (i.e., the output signal from the inverting circuit 336) and the input voltage $V_{IN}$ is equal to a coefficient (α). For example, the output signal from the inverting circuit 336 can be expressed as:

$$V_{iv} = -\alpha V_{in}, \quad (1)$$

where Viv represents the output signal from the inverting circuit 336, α represents the voltage coefficient, and $V_{in}$ represents the input voltage. The output voltage $V_{out}$ is outputted to the capacitor 316 from a node 338 that is between the resistor 332 and the collector terminal (C) of the bipolar junction transistor $Q_B$. To drive a termination load (e.g. 50Ω), the voltage mode TX driver shows a termination for the best power delivery and signal integrity performance, which will be $R_{out} \sim R_P + 1/g_m$ while $g_m$ is the transconductance of the bipolar junction transistor $Q_T$. For example, because there is no primary feedback path from Vout to Viv, Rout can be defined to first order from the impedance presented by the BJT $Q_T$ and the resistance RP, and the BJT $Q_B$ can influence Rout to some degree because it provides an impedance that is in parallel with the output.

Figure 4:
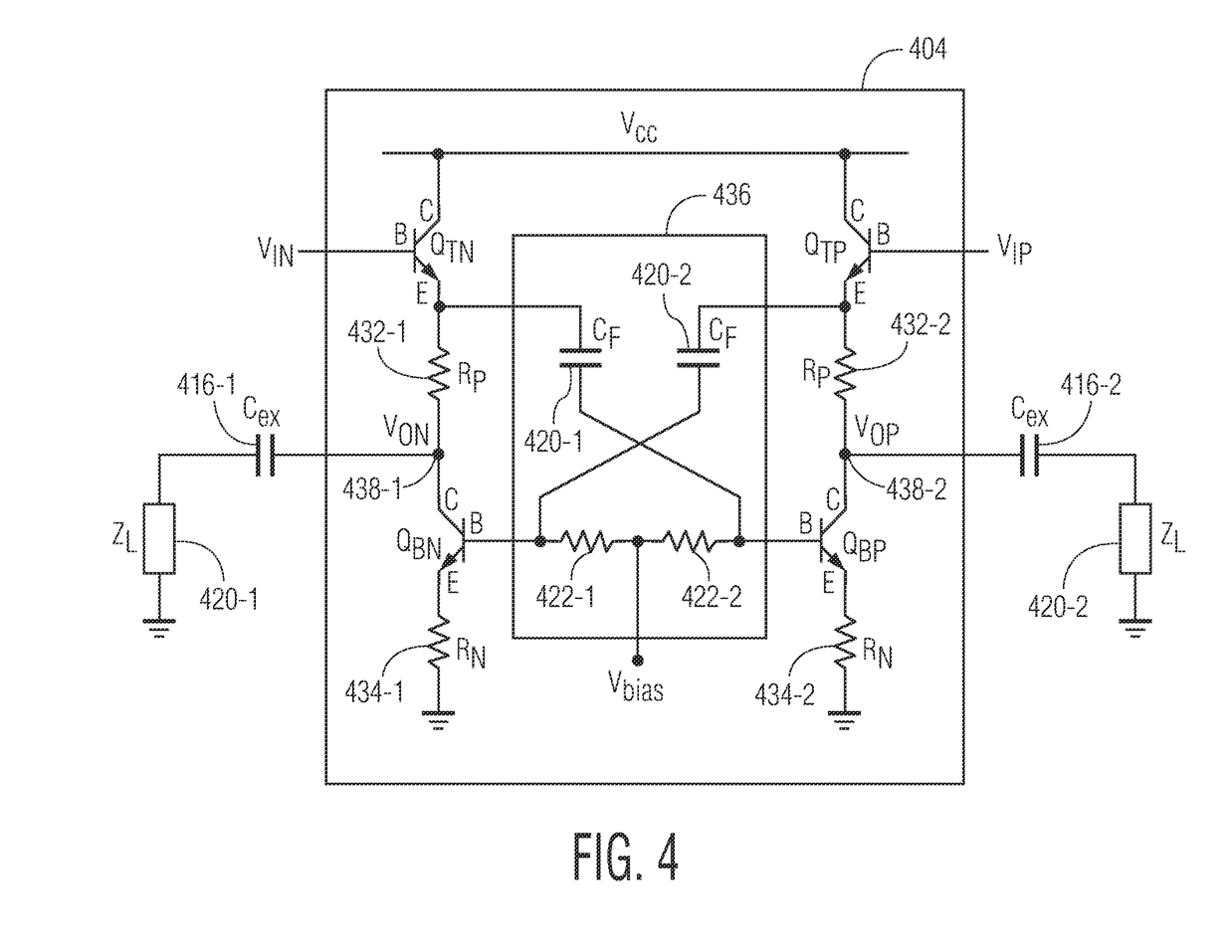
FIG. 4 is a schematic diagram of an Alternating Current (AC)-coupled voltage mode TX driver in accordance with an embodiment of the invention.

FIG. 4 is a schematic diagram of an Alternating Current (AC)-coupled voltage mode TX driver 404 in accordance with an embodiment of the invention. The AC-coupled voltage mode TX driver 404 depicted in FIG. 4 is an embodiment of the TX driver 104 depicted in FIGS. 1 and 2. However, the TX driver 104 depicted in FIGS. 1 and 2 is not limited to the embodiment shown in FIG. 4. In the embodiment depicted in FIG. 4, the AC-coupled voltage mode TX driver 404 is a push-pull TX driver in fully differential form that is connected to decoupling capacitors 416-1, 416-2 with a capacitance value $C_{ex}$ and termination units 420-1, 420-2 with an impedance value $Z_L$ (e.g., 50Ω output impedance). As shown in FIG. 4, the AC-coupled voltage mode TX driver 404 includes a bipolar junction transistor (BJT) $Q_{TN}$ connectable between an input voltage $V_{IN}$ and a supply voltage $V_{CC}$, a bipolar junction transistor $Q_{BN}$, a resistor 432-1 with a resistance value $R_P$ and connectable between the bipolar junction transistor $Q_{TN}$ and the bipolar junction transistor $Q_{BN}$, a resistor 434-1 with a resistance value $R_N$ and connectable between the bipolar transistor $Q_{BN}$ and a reference voltage (e.g., the ground (zero volt), a bipolar junction transistor (BJT) $Q_{TP}$ connectable between an input voltage $V_{IP}$ and the supply voltage $V_{CC}$, a bipolar junction transistor $Q_{BP}$, a resistor 432-2 with the resistance value $R_P$ and connectable between the bipolar junction transistor $Q_{TP}$ and the bipolar junction transistor $Q_{BP}$, a resistor 434-2 with the resistance value $R_N$ and connectable between the bipolar transistor $Q_{BP}$ and a reference voltage (e.g., the ground (zero volt), capacitors 420-1, 420-2 with a capacitance value $C_{EX}$ cross-connectable between the bipolar junction transistors $Q_{TN}$ and $Q_{BP}$ and between the bipolar junction transistors $Q_{TP}$ and $Q_{BN}$, respectively, and resistors 422-1, 422-2 connectable between the bipolar junction transistors $Q_{BP}$ and $Q_{BN}$ and a bias voltage, $V_{BIAS}$. Although the voltage mode TX driver 404 is depicted in FIG. 4 as implemented using BJTs, in other embodiments, the voltage mode TX driver 304 is implemented using metal-oxide-semiconductor field-effect transistor (MOSFETs). In addition, although the BJTs $Q_{TN}$, $Q_{TP}$, $Q_{BN}$, $Q_{BP}$ are implemented as NPN transistors in the embodiment depicted in FIG. 4, in other embodiments, at least one of the BJTs $Q_{TN}$, $Q_{TP}$, $Q_{BN}$, $Q_{BP}$ is implemented as a PNP transistor. The capacitors 420-1, 420-2 and the resistors 422-1, 422-2 form an inverting circuit 436 configured to generate an inverted version of input signals with input voltages $V_{IN}$, $V_{IP}$ for the base terminal (B) of the bipolar junction transistors $Q_{BP}$ and $Q_{BN}$. An inverted version of the input voltage $V_{IN}$ may be constructed from the input voltage $V_{IN}$ (e.g., by an inverter and/or an amplifier/attenuator such that the phase of the inverted version of the input voltage $V_{IN}$ is 180 degree from the phase of the input voltage $V_{IN}$) or may be a naturally occurring negative differential signal that is complementary to the input voltage $V_{IN}$ (e.g., the phase of the inverted version of the input voltage $V_{IN}$ is 180 degree from the phase of the input voltage $V_{IN}$). In some embodiments, the input voltage $V_{IN}$ and the inverted version of the input voltage $V_{IN}$ form a differential pair of signals. An inverted version of the input voltage $V_{IP}$ may be constructed from the input voltage $V_{IP}$ (e.g., by an inverter and/or an amplifier/attenuator such that the phase of the inverted version of the input voltage $V_{IP}$ is 180 degree from the phase of the input voltage $V_{IP}$) or may be a naturally occurring negative differential signal that is complementary to the input voltage $V_{IP}$ (e.g., the phase of the inverted version of the input voltage $V_{IP}$ is 180 degree from the phase of the input voltage $V_{IP}$). In some embodiments, the input voltage $V_{IP}$ and the inverted version of the input voltage $V_{IP}$ form a differential pair of signals.

In the AC-coupled voltage mode TX driver 404 depicted in FIG. 4, input signals with input voltages $V_{IN}$, $V_{IP}$ are applied to the base terminals (B) of the bipolar junction transistors $Q_{TN}$ and $Q_{TP}$ through conductive paths (e.g., electrical wires or lines that create electrical connections when powered up) such that the bipolar junction transistors $Q_{TN}$ and $Q_{TP}$ are electrically connected to the input voltages $V_{IN}$, $V_{IP}$, and output signals with output voltages $V_{ON}$, $V_{OP}$ are outputted to the capacitors 416-1, 416-2 from nodes 438-1, 438-2 that are between the resistors 432-1, 432-2 and the bipolar junction transistors $Q_{BN}$ and $Q_{BP}$, respectively. A supply voltage $V_{CC}$ is applied to the collector terminals (C) of the bipolar junction transistors $Q_{TN}$ and $Q_{TP}$ through conductive paths (e.g., electrical wires or lines that create electrical connections when powered up) such that the bipolar junction transistors $Q_{TN}$ and $Q_{TP}$ are electrically connected to the supply voltage $V_{CC}$, and the emitter terminals (E) of the bipolar junction transistors $Q_{TN}$ and $Q_{TP}$ are connected to the resistors 432-1, 432-2, respectively, through conductive paths (e.g., electrical wires or lines that create electrical connections when powered up) such that the bipolar junction transistors $Q_{TN}$ and $Q_{TP}$ are electrically connected to the resistors 432-1, 432-2. An inverted version of $V_{IN}$ (i.e., an output signal from the capacitor 420-2 and the resistor 422-1) is applied to the base terminal (B) of the bipolar junction transistor $Q_{BN}$ through a conductive path (e.g., an electrical wire or line that creates an electrical connection when powered up) such that the bipolar junction transistor $Q_{BN}$ is electrically connected to the output signal from the capacitor 420-2 and the resistor 422-1, the collector terminal (C) of the bipolar junction transistor $Q_{BN}$ is connected to the resistor 432-1 through a conductive path (e.g., an electrical wire or line that creates an electrical connection when powered up) such that the bipolar junction transistor $Q_{BN}$ is electrically connected to the resistor 432-1, and the emitter terminal (E) of the bipolar junction transistor $Q_{BN}$ is connected to the resistor 434-1, which is connected to ground through a conductive path (e.g., an electrical wire or line that creates an electrical connection when powered up) such that the bipolar junction transistor $Q_{BN}$ is electrically connected to the resistor 434-1. For example, the emitter of the BJT $Q_{TP}$ drives the base of the BJT $Q_{BN}$ with a version of the signal $V_{IP}$, which is phase inverted from the signal $V_{IN}$. An inverted version of $V_{IP}$ (i.e., an output signal from the capacitor 420-2 and the resistor 422-2) is applied to the base terminal (B) of the bipolar junction transistor $Q_{BP}$ through a conductive path (e.g., an electrical wire or line that creates an electrical connection when powered up) such that the bipolar junction transistor $Q_{BP}$ is electrically connected to the output signal from the capacitor 420-2 and the resistor 422-2, the collector terminal (C) of the bipolar junction transistor $Q_{BP}$ is connected to the resistor 432-2 through a conductive path (e.g., an electrical wire or line that creates an electrical connection when powered up) such that the bipolar junction transistor $Q_{BP}$ is electrically connected to the resistor 432-2, and the emitter terminal (E) of the bipolar junction transistor $Q_{BP}$ is connected to the resistor 434-2, which is connected to ground, through a conductive path (e.g., an electrical wire or line that creates an electrical connection when powered up) such that the bipolar junction transistor $Q_{BP}$ is electrically connected to the resistor 434-2. For example, the emitter of the BJT $Q_{TN}$ drives the base of the BJT $Q_{BP}$ with a version of the signal $V_{IN}$, which is phase inverted from the signal $V_{IP}$.

In the AC-coupled voltage mode TX driver 404 depicted in FIG. 4, the bias voltage for the lower BJT transistors $Q_{BN}$ and $Q_{BP}$ is provided by, for example, an external bias signal with a voltage $V_{BIAS}$, which may be generated by an external voltage source. The AC gain of around 0 dB of the AC-coupled voltage mode TX driver 404 is available at high-frequency. The AC bandwidth (BW) −3 dB of the AC-coupled voltage mode TX driver 404 can be over 100 GHz. The AC-coupled voltage mode TX driver 404 can provide high output swing with much smaller current, around 75% smaller compared to a current mode (CML) TX driver. The AC-coupled voltage mode TX driver 404 can provide controlled output impedance with good matching to 45Ω. The gain of ~0 dB with a BW of over 100 GHz and outstanding linearity of better than 1.6V (1 dB compression point), which is much better than a CML based TX driver.

Figure 5:
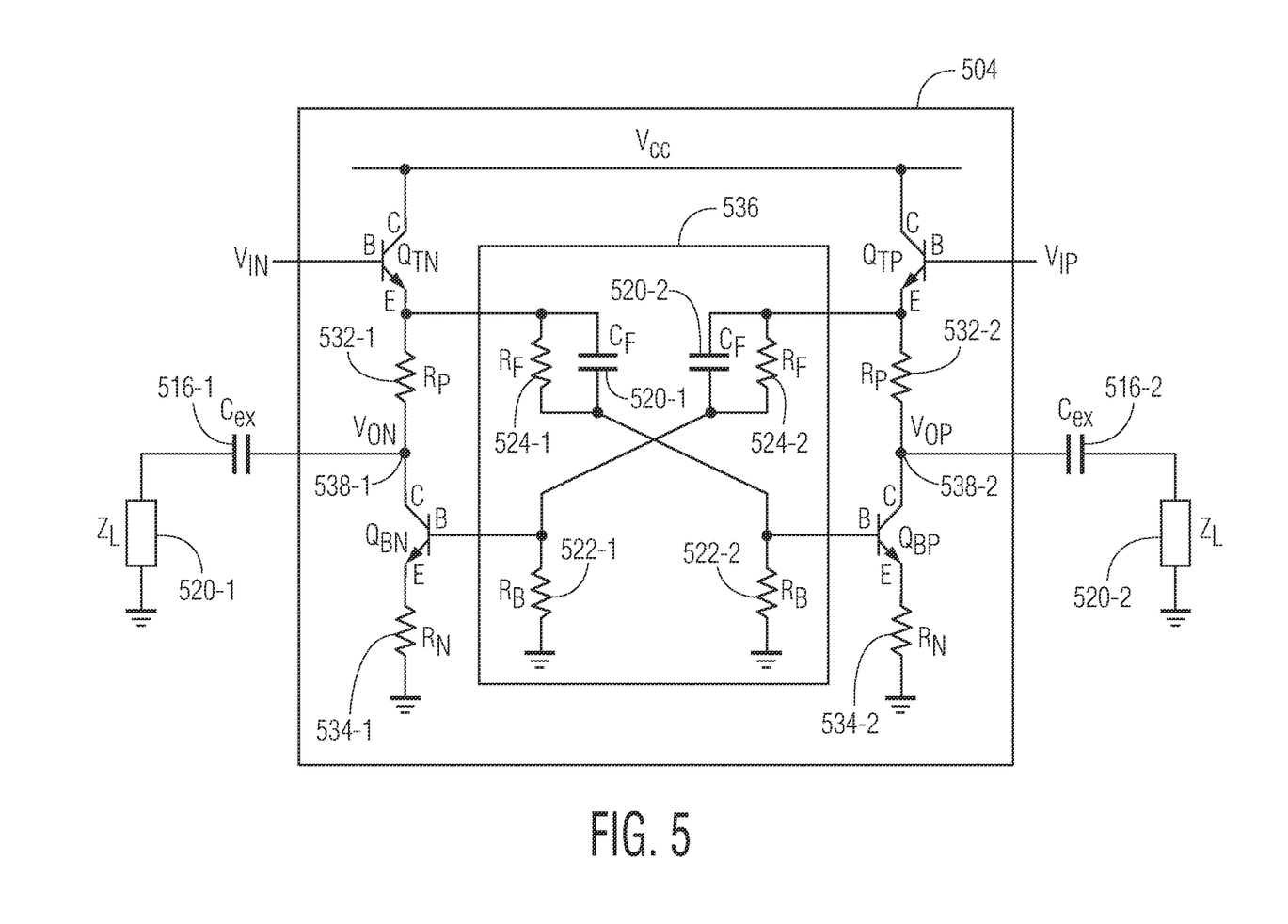
FIG. 5 is a schematic diagram of a direct current (DC)-coupled voltage mode TX driver in accordance with an embodiment of the invention.

FIG. 5 is a schematic diagram of a direct current (DC)-coupled voltage mode TX driver 504 in accordance with an embodiment of the invention. The DC-coupled voltage mode TX driver 504 depicted in FIG. 5 is an embodiment of the TX driver 104 depicted in FIGS. 1 and 2. However, the TX driver 104 depicted in FIGS. 1 and 2 is not limited to the embodiment shown in FIG. 5. In the embodiment depicted in FIG. 5, the DC-coupled voltage mode TX driver 504 is a push-pull TX driver in fully differential form that is connected to decoupling capacitors 516-1, 516-2 with a capacitance value $C_{EX}$ and termination units 520-1, 520-2 with an impedance value $Z_L$ (e.g., 50Ω output impedance). As shown in FIG. 5, the DC-coupled voltage mode TX driver 504 includes a BJT $Q_{TN}$ connectable between an input voltage $V_{IN}$ and a supply voltage $V_{CC}$, a bipolar junction transistor $Q_{BN}$, a resistor 532-1 with a resistance value $R_P$ and connectable between the bipolar junction transistor $Q_{TN}$ and the bipolar junction transistor $Q_{BN}$, a resistor 534-1 with a resistance value $R_N$ and connectable between the bipolar transistor $Q_{BN}$ and a reference voltage (e.g., the ground (zero volt), a bipolar junction transistor (BJT) $Q_{TP}$ connectable between an input voltage $V_{IP}$ and the supply voltage $V_{CC}$, a bipolar junction transistor $Q_{BP}$, a resistor 532-2 with the resistance value $R_P$ and connectable between the bipolar junction transistor $Q_{TP}$ and the bipolar junction transistor $Q_{BP}$, a resistor 534-2 with the resistance value $R_N$ and connectable between the bipolar transistor $Q_{BP}$ and a reference voltage (e.g., the ground (zero volt), capacitors 520-1, 520-2 with a capacitance value $C_F$ and resistors 524-1, 524-2 with a resistance value $R_F$ cross-connectable between the bipolar junction transistors $Q_{TN}$ and $Q_{BP}$ and between the bipolar junction transistors $Q_{TP}$ and $Q_{BN}$, respectively, and resistors 522-1, 522-2 connectable between the bipolar junction transistors $Q_{BP}$ and $Q_{BN}$ with a resistance value $R_B$ and a reference voltage, e.g., the ground. Although the voltage mode TX driver 504 is depicted in FIG. 5 as implemented using BJTs, in other embodiments, the voltage mode TX driver 504 is implemented using metal-oxide-semiconductor field-effect transistor (MOSFETs). In addition, although the BJTs $Q_{TN}$, $Q_{TP}$, $Q_{BN}$, $Q_{BP}$ are implemented as NPN transistors in the embodiment depicted in FIG. 4, in other embodiments, at least one of the BJTs $Q_{TN}$, $Q_{TP}$, $Q_{BN}$, $Q_{BP}$ is implemented as a PNP transistor. The capacitors 520-1, 520-2 and the resistors 522-1, 522-2, 524-1, 524-2 form an inverting circuit 536 configured to generate an inverted version of input signals with input voltages $V_{IN}$, $V_{IP}$ for the base terminal (B) of the bipolar junction transistors $Q_{BP}$ and $Q_{BN}$. An inverted version of the input voltage $V_{IN}$ may be constructed from the input voltage $V_{IN}$ (e.g., by an inverter and/or an amplifier/attenuator such that the phase of the inverted version of the input voltage $V_{IN}$ is 180 degree from the phase of the input voltage $V_{IN}$) or may be a naturally occurring negative differential signal that is complementary to the input voltage $V_{IN}$ (e.g., the phase of the inverted version of the input voltage $V_{IN}$ is 180 degree from the phase of the input voltage $V_{IN}$). In some embodiments, the input voltage $V_{IN}$ and the inverted version of the input voltage $V_{IN}$ form a differential pair of signals. An inverted version of the input voltage $V_{IP}$ may be constructed from the input voltage $V_{IP}$ (e.g., by an inverter and/or an amplifier/attenuator such that the phase of the inverted version of the input voltage $V_{IP}$ is 180 degree from the phase of the input voltage $V_{IP}$) or may be a naturally occurring negative differential signal that is complementary to the input voltage $V_{IP}$ (e.g., the phase of the inverted version of the input voltage $V_{IP}$ is 180 degree from the phase of the input voltage $V_{IP}$). In some embodiments, the input voltage $V_{IP}$ and the inverted version of the input voltage $V_{IP}$ form a differential pair of signals.

In the DC-coupled voltage mode TX driver 504 depicted in FIG. 5, input signals with input voltages $V_{IN}$, $V_{IP}$ are applied to the base terminals (B) of the bipolar junction transistors $Q_{TN}$ and $Q_{TP}$ through conductive paths (e.g., electrical wires or lines that create electrical connections when powered up) such that the bipolar junction transistors $Q_{TN}$ and $Q_{TP}$ are electrically connected to the input voltages $V_{IN}$, $V_{IP}$, and output signals with output voltages $V_{ON}$, $V_{OP}$ are outputted to the capacitors 516-1, 516-2 from nodes 538-1, 538-2 that are between the resistors 532-1, 532-2 and the bipolar junction transistors $Q_{BN}$ and $Q_{BP}$, respectively. A supply voltage $V_{CC}$ is applied to the collector terminals (C) of the bipolar junction transistors $Q_{TN}$ and $Q_{TP}$ through conductive paths (e.g., electrical wires or lines that create electrical connections when powered up) such that the bipolar junction transistors $Q_{TN}$ and $Q_{TP}$ are electrically connected to the supply voltage $V_{CC}$, and the emitter terminals (E) of the bipolar junction transistor $Q_{TN}$ and $Q_{TP}$ are connected to the resistors 532-1, 532-2, respectively, through conductive paths (e.g., electrical wires or lines that create electrical connections when powered up) such that the bipolar junction transistors $Q_{TN}$ and $Q_{TP}$ are electrically connected to the resistors 532-1, 532-2. An inverted version of $V_{IN}$ (i.e., an output signal from the capacitor 520-2 and the resistor 524-2) is applied to the base terminal (B) of the bipolar junction transistor $Q_{BN}$ through a conductive path (e.g., an electrical wire or line that creates an electrical connection when powered up) such that the bipolar junction transistor $Q_{BN}$ is electrically connected to the output signal from the capacitor 520-2 and the resistor 524-2, the collector terminal (C) of the bipolar junction transistor $Q_{BN}$ is connected to the resistor 532-1 through a conductive path (e.g., an electrical wire or line that creates an electrical connection when powered up) such that the bipolar junction transistor $Q_{BN}$ is electrically connected to the resistor 532-1, and the emitter terminal (E) of the bipolar junction transistor $Q_{BN}$ is connected to the resistor 534-1, which is connected to ground, through a conductive path (e.g., an electrical wire or line that creates an electrical connection when powered up) such that the bipolar junction transistor $Q_{BN}$ is electrically connected to the resistor 534-1. For example, the emitter of the BJT $Q_{TP}$ drives the base of the BJT $Q_{BN}$ with a version of the signal $V_{IP}$, which is phase inverted from the signal $V_{IN}$. An inverted version of $V_{IP}$ (i.e., an output signal from the capacitor 520-1 and the resistor 524-1) is applied to the base terminal (B) of the bipolar junction transistor $Q_{BP}$ through a conductive path (e.g., an electrical wire or line that creates an electrical connection when powered up) such that the bipolar junction transistor $Q_{BP}$ is electrically connected to the output signal from the capacitor 520-1 and the resistor 524-1, the collector terminal (C) of the bipolar junction transistor $Q_{BP}$ is connected to the resistor 532-2 through a conductive path (e.g., an electrical wire or line that creates an electrical connection when powered up) such that the bipolar junction transistor $Q_{BP}$ is electrically connected to the resistor 532-2, and the emitter terminal (E) of the bipolar junction transistor $Q_{BP}$ is connected to the resistor 534-2, which is connected to ground, through a conductive path (e.g., an electrical wire or line that creates an electrical connection when powered up) such that the bipolar junction transistor $Q_{BP}$ is electrically connected to the resistor 534-2. For example, the emitter of the BJT $Q_{TN}$ drives the base of the BJT $Q_{BP}$ with a version of the signal $V_{IN}$, which is phase inverted from the signal $V_{IP}$.

In the DC-coupled voltage mode TX driver 504 depicted in FIG. 5, the bias voltage for the lower BJT transistors $Q_{BN}$ and $Q_{BP}$ is provided by the DC-coupled voltage mode TX driver 504. The gain of around 1 dB of the DC-coupled voltage mode TX driver 504 is available at high-frequency. The AC Bandwidth −3 dB of the DC-coupled voltage mode TX driver 504 can be very high, even over 100 GHz. The DC-coupled voltage mode TX driver 504 can good output matching to termination in a voltage push-current pull approach, linearity improved from AC-coupled, and controlled output impedance with good matching to 45Ω or 50Ω.

Figure 6:
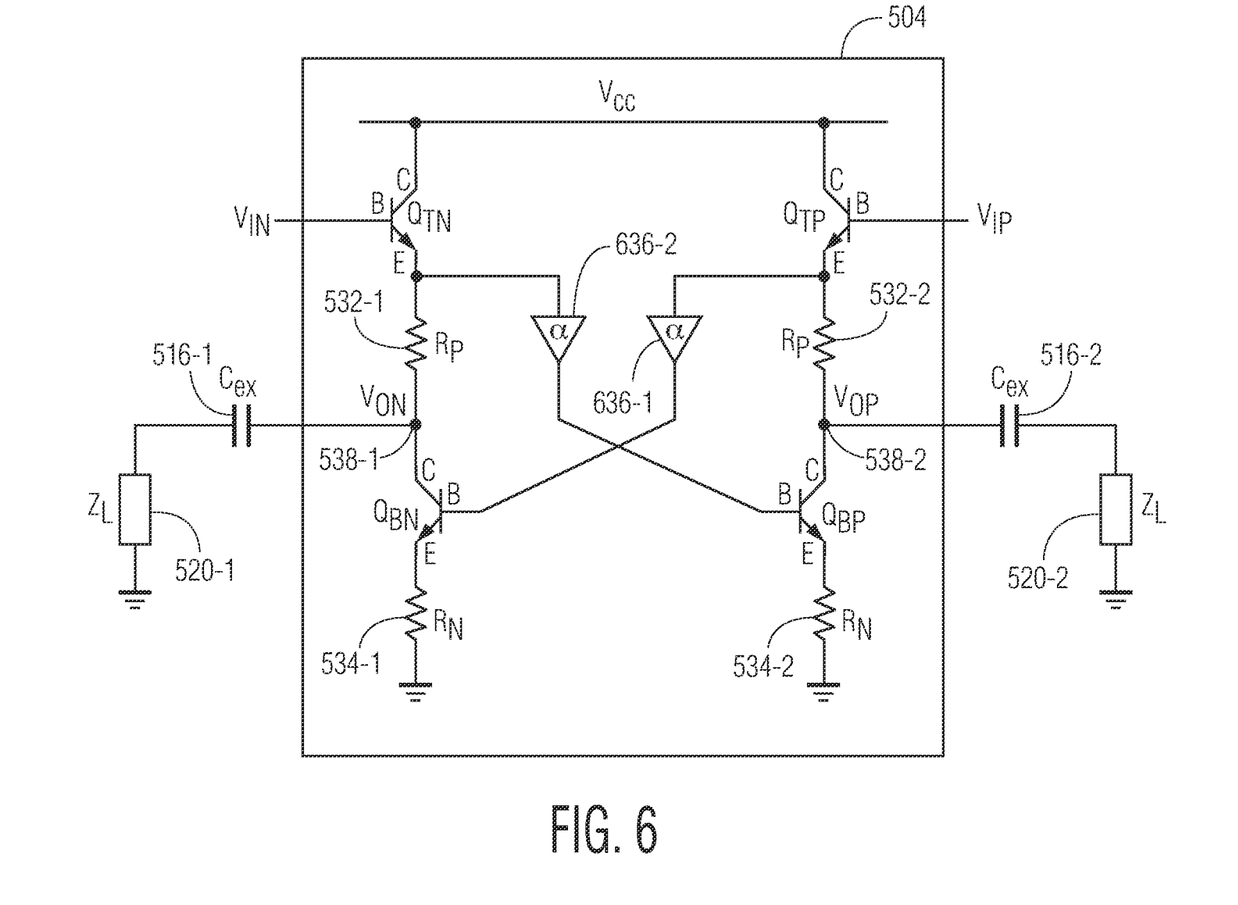
FIG. 6 shows the DC-coupled voltage mode TX driver depicted in FIG. 5 in which an inverting circuit is replaced with sampling components with a coefficient.
Figure 7:
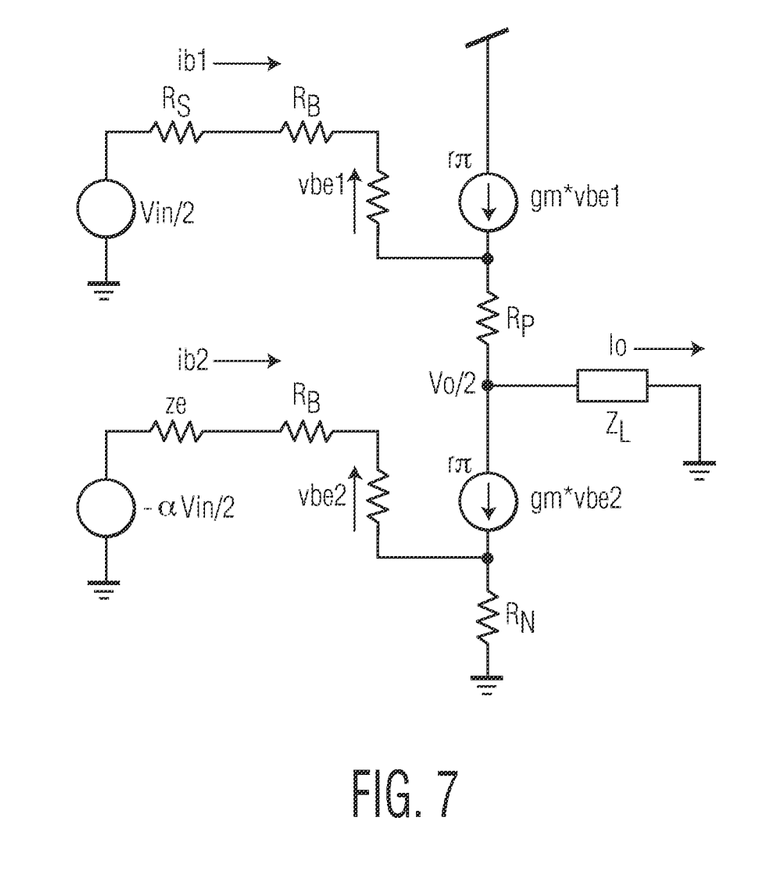
FIG. 7 shows an equivalent small signal model of the DC-coupled voltage mode TX driver depicted in FIG. 5 in which the inverting circuit is replaced with the sampling components with the coefficient.

FIG. 6 shows the DC-coupled voltage mode TX driver 504 depicted in FIG. 5 in which the inverting circuit 536 is replaced with sampling components 636-1, 636-2 with a coefficient of α. FIG. 7 shows an equivalent small signal model of the DC-coupled voltage mode TX driver 504 depicted in FIG. 5 in which the inverting circuit 536 is replaced with the sampling components 636-1, 636-2 with the coefficient of a. Considering input voltage $V_I = V_{IP} - V_{IN}$ and $V_{OUT} = V_{OP} - V_{ON}$, the gain of the DC-coupled voltage mode TX driver 504 can be calculated as:

$$\frac{Vin}{2} = ib1(RS + RB) + ib1\frac{\beta}{gm} + ib1(1+\beta)RP + \frac{Vo}{2} \quad (2)$$

$$\frac{-\alpha Vin}{2} = ib2(ze + RB) + ib2\frac{\beta}{gm} + ib2(1+\beta)RN \quad (3)$$

$$\frac{Vo}{2} = [ib1(1-\beta) - ib2(1+\beta)]ZL \quad (4)$$

Both α and β are functions of the operating frequency, particularly transistor beta $\beta(f) = \beta_0/(1 + j\beta_0(f/f_T))$. Consequently, the voltage gain is frequency-dependent, although the voltage gain can be constant in relatively high frequencies. Voltage Gain versus frequency can be achieved as:

$$AV(f) = 1 - \left[1 - \frac{\alpha\beta \cdot ZL}{ze + RB + \frac{\beta}{gm} + (1+\beta)RN}\right]\left[\frac{RS + RB + \frac{\beta}{gm} + (1+\beta)RP}{RS + RB + \frac{\beta}{gm} + (1+\beta)(RP+ZL)}\right] \quad (5)$$

Voltage Gain versus frequency can be simplified as (will be a constant gain):

$$AV \cong 1 - \left(1 - \frac{\alpha \cdot gm \cdot ZL}{1 + gm \cdot RN}\right)\left[\frac{1 + gm \cdot RP}{1 + gm(RP + ZL)}\right] \quad (6)$$

$R_P$ and $R_N$ include transistor ohmic terminal resistance along with external degeneration. Resistance ze represents the upper emitter follower (e.g., the BJT $Q_{TP}$ or $Q_{TN}$)' output impedance, roughly equal to $(1/g_m + R_E)$.

Figure 8:
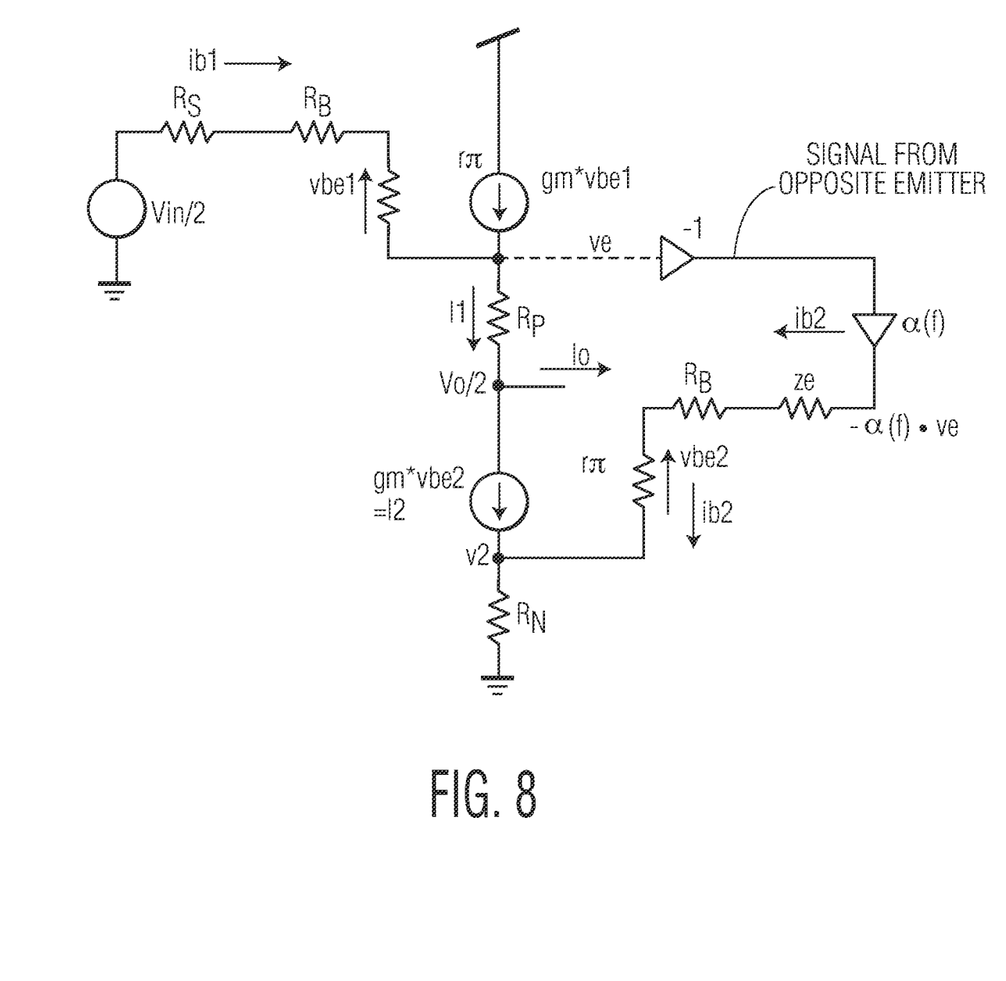
FIG. 8 shows an equivalent small signal model of the DC-coupled voltage mode TX driver depicted in FIG. 5.

FIG. 8 shows an equivalent small signal model of the DC-coupled voltage mode TX driver 504 depicted in FIG. 5, assuming that the emitter current of $Q_{BN}$ and $Q_{BP}$ transistors is IE to calculate output impedance. Node Equations can be written as:

$$Io = I1 - I2; \quad (7)$$

$$I1 = ib1 \cdot (1 + \beta);$$

$$I2 = ib2 \cdot \beta;$$

$$I1 = \frac{ve - Vo}{RP}$$

And currents can be calculated as:

$$ib1 = \frac{-ve}{RS + RB + \frac{\beta}{gm}} \quad (8)$$

$$ib2 = \frac{-\alpha \cdot ve}{ze + RB + \frac{\beta}{gm} + (1+\beta)RN} \quad (9)$$

Io and Vo in terms of ve can be achieved as:

$$Io = \frac{-ve(1+\beta)}{RS + RB + \frac{\beta}{gm}} - \frac{-\alpha \cdot \beta \cdot ve}{ze + RB + \frac{\beta}{gm} + (1-\beta)RN} \quad (10)$$

$$Vo = ve\left[1 + \frac{(1+\beta)RP}{RS + RB + \frac{\beta}{gm}}\right] \quad (11)$$

Both α and β are functions of frequency, particularly transistor beta $\beta(f) = \beta_0/(1 + j\beta_0(f/f_T))$. Therefore, Zo is frequency-dependent, although it can be constant in relatively high frequencies. Output Z vs. frequency will be:

$$Zo(f) = \frac{RS + RB + \frac{\beta}{gm} + (1+\beta)RP}{1 + \beta - \frac{\alpha \cdot \beta \cdot \left(RS + RB + \frac{\beta}{gm}\right)}{ze + RB + \frac{\beta}{gm} + (1+\beta)RN}} \quad (12)$$

And output Z vs. frequency can be simplified as (which is constant versus frequency):

$$Zo \cong \frac{\frac{1}{gm} + RP}{1 - \frac{\alpha}{1 + gm \cdot RN}} \quad (13)$$

Although some embodiments of TX drivers are described and shown as being implemented by bipolar transistors, in other embodiments, a TX driver can be implemented by metal-oxide-semiconductor field-effect transistor (MOSFETs).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, electrically erasable programmable read-only memory (EEPROM), a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A linear transmitter (TX) driver comprising:
a first transistor coupled between an input voltage and a supply voltage;
a second transistor coupled between an inverted version of the input voltage and a reference voltage;
a first resistor connected between the first transistor and the second transistor,
an output node;
a second resistor coupled between the second transistor and the reference voltage;
wherein the first transistor is a first bipolar junction transistor (BJT), and wherein the second transistor comprises a second BJT;
wherein a collector terminal of the first BJT is connectable to the supply voltage;
wherein a base terminal of the first BJT is coupled to the input voltage;
wherein an emitter terminal of the first BJT is connected to the first resistor;
wherein a collector terminal of the second BJT is connected to the first resistor;
wherein a base terminal of the second BJT is coupled to the inverted version of the input voltage;
wherein an emitter terminal of the second BJT is connected to the second resistor; and
wherein the collector terminal of the second BJT is connected directly to the output node.

2. The linear TX driver of claim 1, further comprising an inverting circuit configured to generate the inverted version of the input voltage.

3. The linear TX driver of claim 2, wherein the inverting circuit comprises a capacitor and a third resistor.

4. The linear TX driver of claim 3, wherein the third resistor is coupled to the reference voltage or a bias voltage.

5. The linear TX driver of claim 1, wherein the reference voltage is zero volt.

6. The linear TX driver of claim 1, wherein the supply voltage comprises a direct current (DC) voltage.

7. The linear TX driver of claim 1, wherein the linear TX driver is included in a linear redriver.

8. A linear transmitter (TX) driver for a linear redriver, the linear TX driver comprising:
a first bipolar junction transistor (BJT) coupled between a first input voltage and a supply voltage of the linear redriver;
a second BJT coupled between the first BJT and a reference voltage;
a first resistor connected between the first BJT and the second BJT, wherein a first output voltage is outputted from a first node between the first resistor and the second BJT;
a second resistor coupled between the second BJT and the reference voltage;
a third BJT coupled between a second input voltage and the supply voltage of the linear redriver;
a fourth BJT coupled between the third BJT and the reference voltage;
a third resistor connected between the third BJT and the fourth BJT, wherein a second output voltage is outputted from a second node between the third resistor and the fourth BJT;
a fourth resistor coupled between the fourth BJT and the reference voltage; and
an inverting circuit configured to generate an inverted version of the first and second input voltages.

9. The linear TX driver of claim 8, wherein the inverting circuit comprises a plurality of capacitors and a plurality of resistors.

10. The linear TX driver of claim 9, wherein the resistors of the inverting circuit are coupled to a bias voltage.

11. The linear TX driver of claim 8, wherein the reference voltage is zero volt.

12. A direct current (DC)-coupled linear transmitter (TX) driver for a linear redriver, the linear TX driver comprising:

a first bipolar junction transistor (BJT) coupled between a first input voltage and a supply voltage of the linear redriver;
a second BJT coupled between the first BJT and a reference voltage;
a first resistor connected between the first BJT and the second BJT, wherein a first output voltage is outputted from a first node between the first resistor and the second BJT;
a second resistor coupled between the second BJT and the reference voltage;
a third BJT coupled between a second input voltage and the supply voltage of the linear redriver;
a fourth BJT coupled between the third BJT and the reference voltage;
a third resistor connected between the third BJT and the fourth BJT, wherein a second output voltage is outputted from a second node between the third resistor and the fourth BJT;
a fourth resistor coupled between the fourth BJT and the reference voltage; and
an inverting circuit configured to generate an inverted version of the first and second input voltages, wherein the inverting circuit comprises:
a first capacitor and a fifth resistor connected in parallel between the first BJT and the fourth BJT;
a second capacitor and a sixth resistor connected in parallel between the third BJT and the third BJT;
a seventh resistor coupled to the second BJT and the reference voltage; and
an eighth resistor coupled to the fourth BJT and the reference voltage.

* * * * *